March 28, 1967     A. S. THOMAS     3,311,404
CAMPER UNIT
Filed May 10, 1965     6 Sheets-Sheet 1
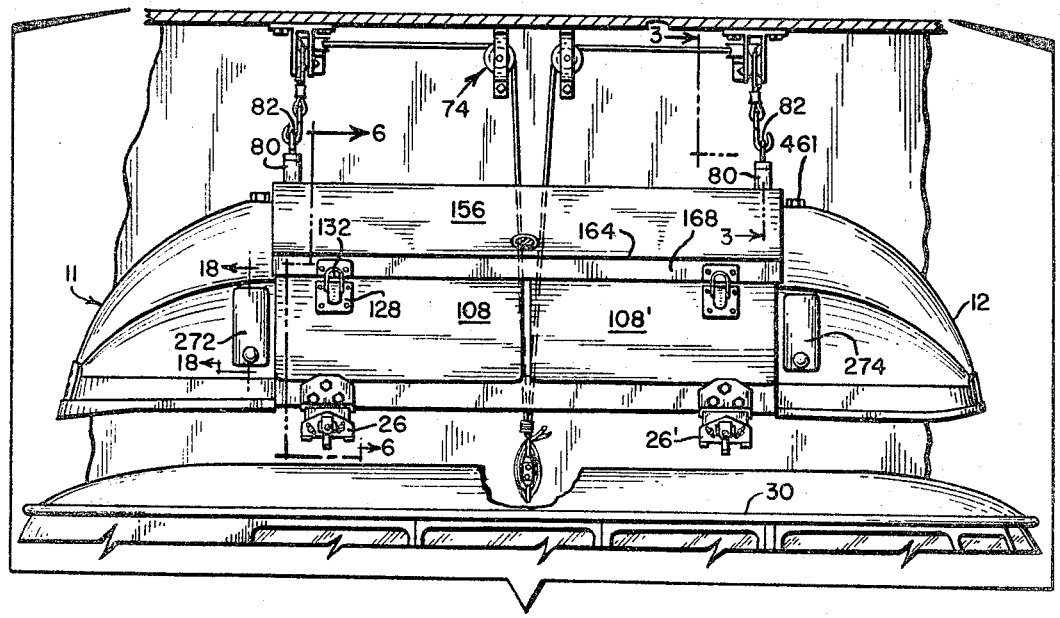
Fig. 1
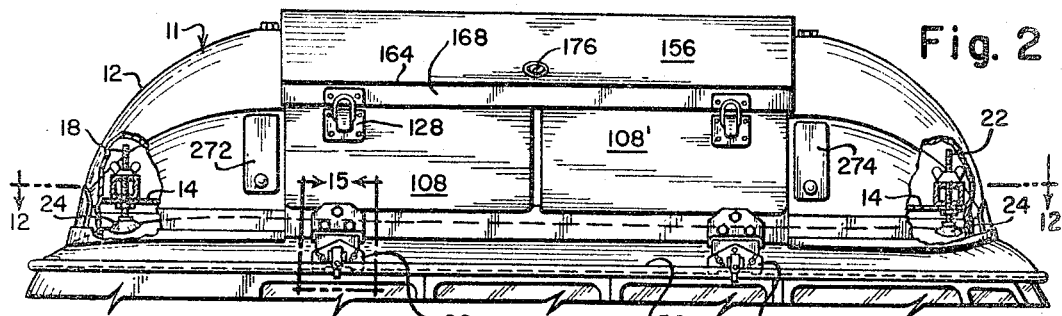
Fig. 2
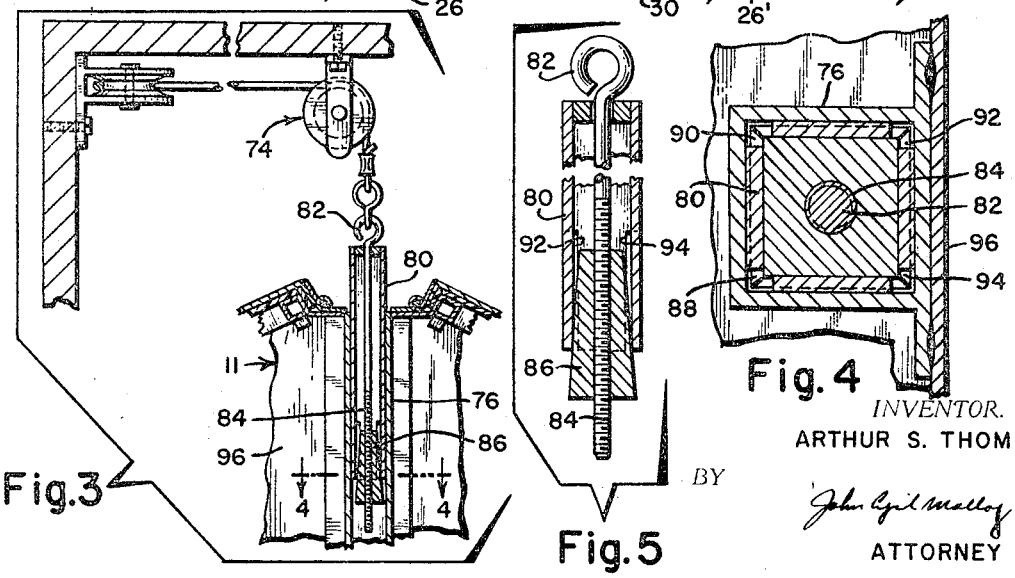
Fig. 3
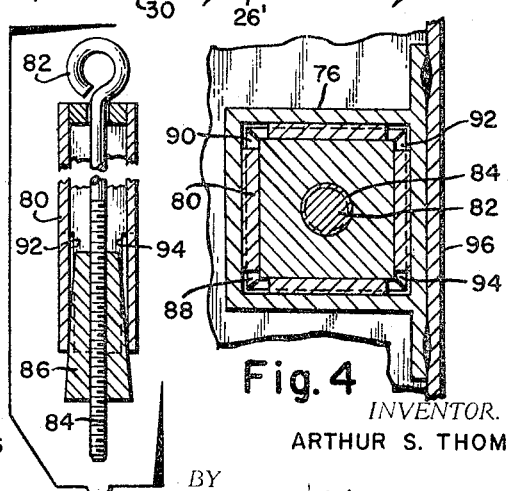
Fig. 5
Fig. 4
INVENTOR.
ARTHUR S. THOMAS
BY
ATTORNEY March 28, 1967  A. S. THOMAS  3,311,404
CAMPER UNIT
Filed May 10, 1965  6 Sheets-Sheet 2

INVENTOR.
ARTHUR S. THOMAS
BY
ATTORNEY

March 28, 1967  A. S. THOMAS  3,311,404
CAMPER UNIT
Filed May 10, 1965  6 Sheets-Sheet 3
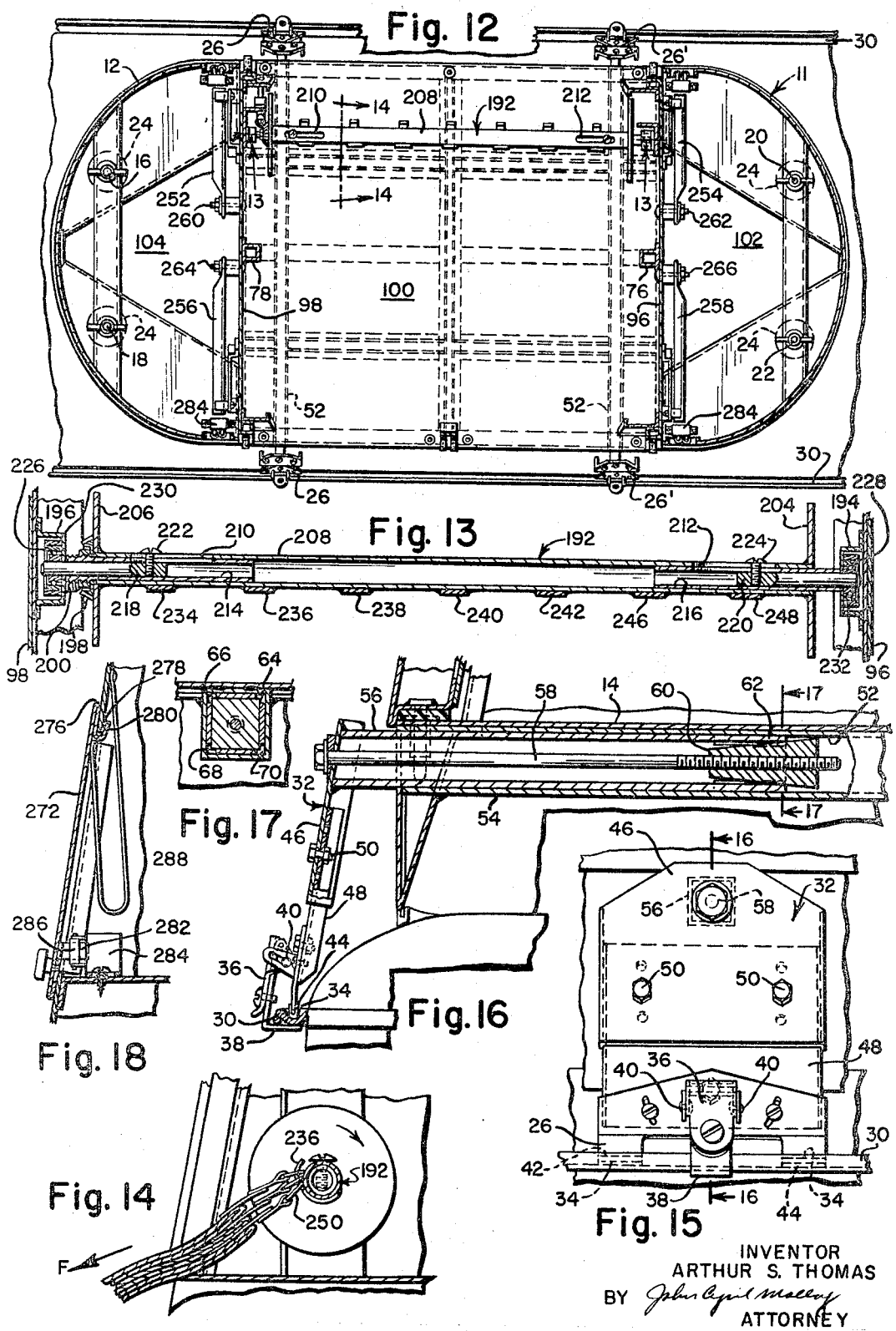
INVENTOR
ARTHUR S. THOMAS
BY John Cyril Malloy
ATTORNEY March 28, 1967 — A. S. THOMAS — 3,311,404
CAMPER UNIT
Filed May 10, 1965 — 6 Sheets-Sheet 4

INVENTOR.
ARTHUR S. THOMAS
BY John Cyril Malloy
ATTORNEY

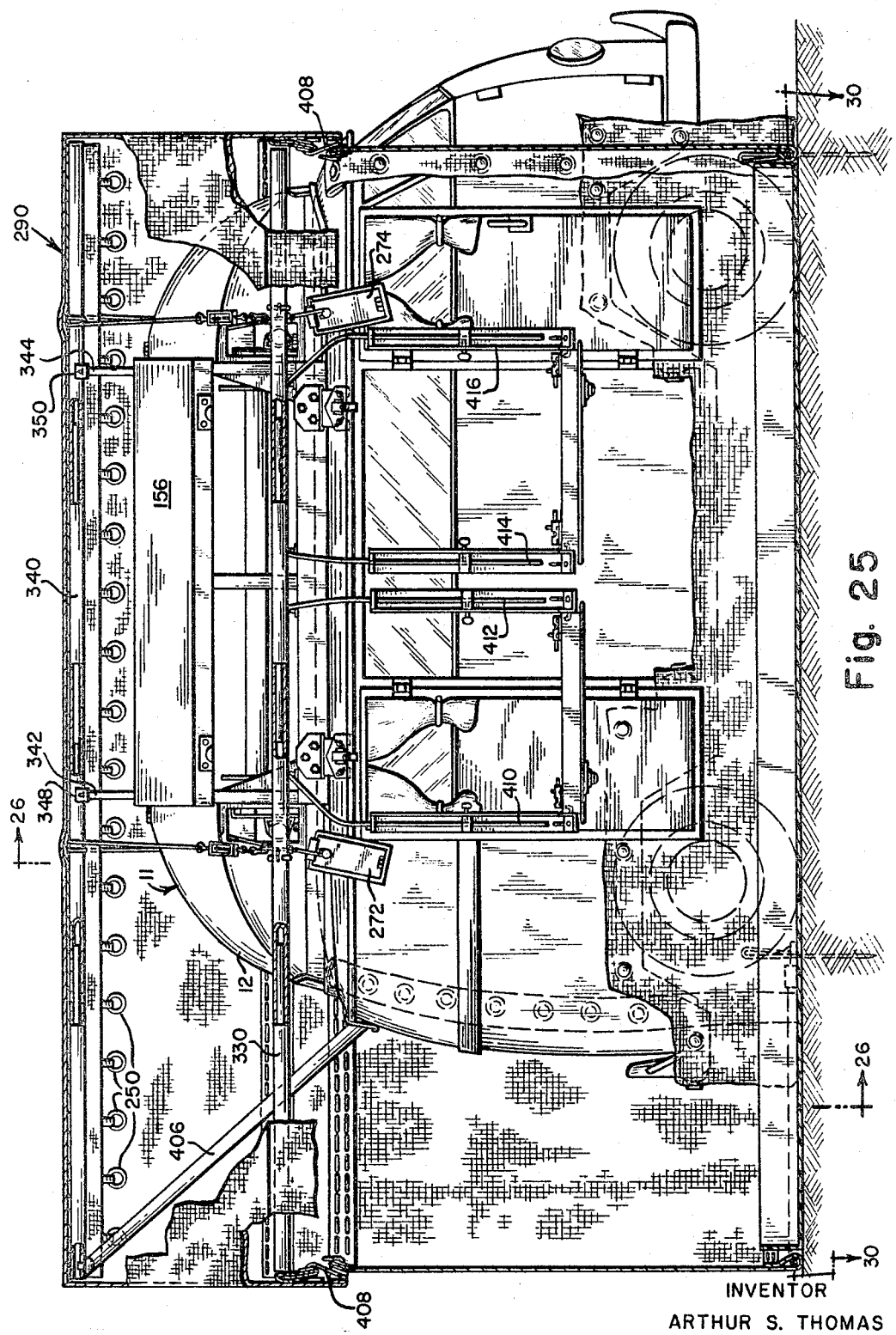

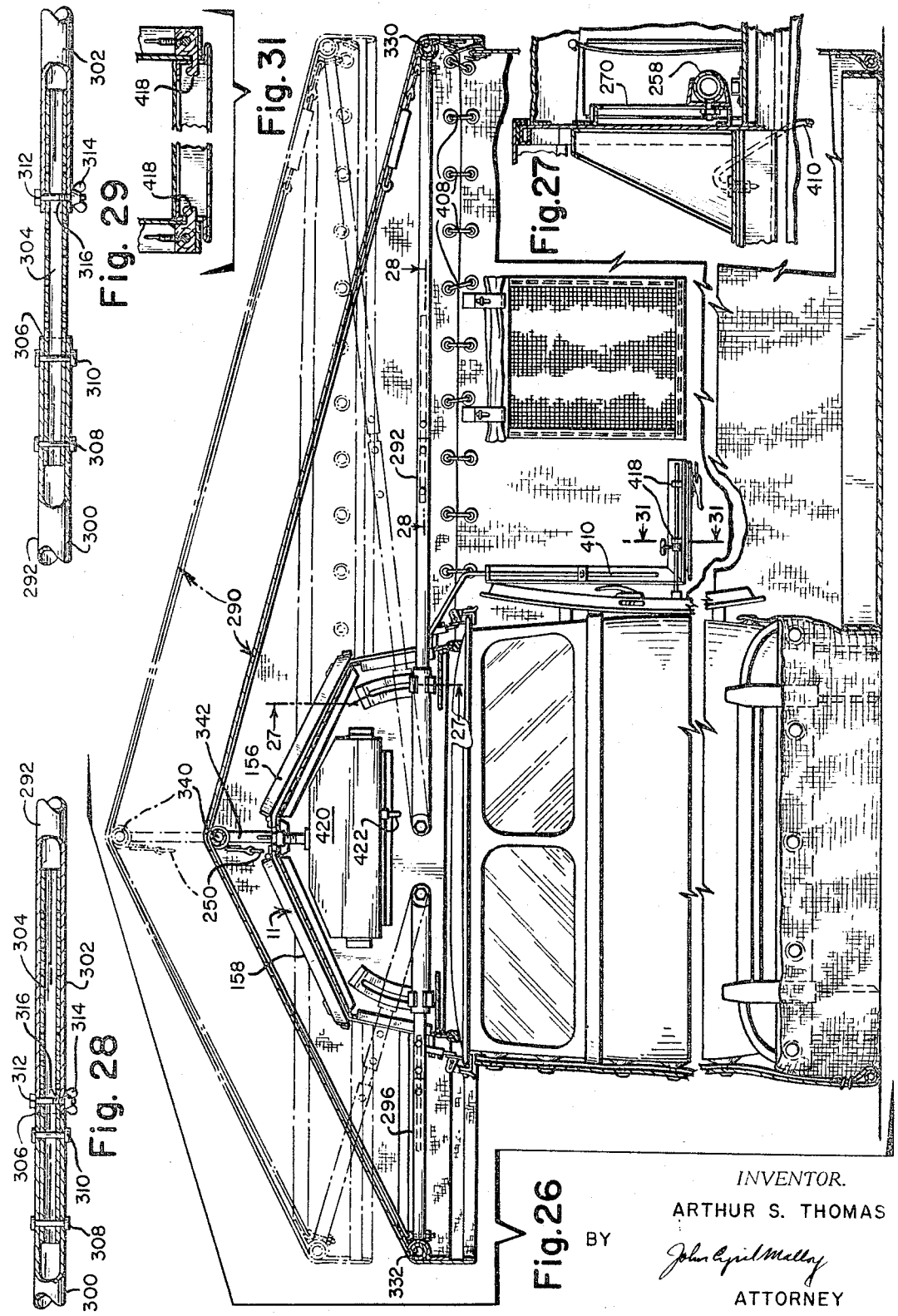

United States Patent Office 3,311,404
Patented Mar. 28, 1967

3,311,404
CAMPER UNIT
Arthur S. Thomas, 3121 NW. 2nd St.,
Miami, Fla. 33060
Filed May 10, 1965, Ser. No. 454,522
5 Claims. (Cl. 296—23)

This invention relates to a camping unit, and, more particularly, to a camper unit for carrying campers' articles on a moving vehicle, which unit is adapted to be extended into the frame for a tent structure.

As is perhaps well known, in recent years, the sport of camping has become quite popular and many families travel to national parks and the like and set up tents or other temporary structures for the purpose of enjoying the out of doors. The present invention provides a unit adapted to be carried on a conventional automobile and provides and includes articles therein arranged for use in setting up a temporary structure for campers.

The unit includes a fabricated housing having moisture or dust sealed doors, which housing is adapted to be fitted on and clamped to an automobile roof by means of adjustable brackets which are part of the reinforcement network of the housing. The housing supports an awning tent by suitable mounting means which are provided with a manual control for raising and lowering it. The awning unit is adapted to be extended and supported on a frame including a ridge pole supported centrally of the housing and spreader bars and eave poles arranged such that a tent may be supported thereover with the edges or skirts of the tent extending downwardly around the periphery of the frame. The skirts or enclosing curtains may be hung from the eaves of the frame and suitable doors may be arranged for entrance and exit into the tent.

It is, accordingly, an object of this invention to provide a campers' unit which includes a housing adapted to be connected and locked in position on any of the conventional automobile vehicles which includes locking means for doors arranged for access into a storage compartment which houses a plurality of members adapted to be connected to the housing to provide a tent frame and, which also houses, a tent canopy in a roll within the housing, which canopy is adapted to be unrolled and supported on the frame when assembled.

Another object of the invention is to provide a device which will efficiently perform the purposes for which it is intended, which is simple and economical in construction, which can be expeditiously and conveniently manipulated and which can be readily manufactured and assembled in quantity.

To the accomplishment of the foregoing and such other objects as may appear hereinafter, the invention comprises the novel method, construction and operation of parts hereinafter to be described in detail and then sought to be defined in the appended claims, reference being made to the accompanying drawings forming a part hereof which illustrate, merely for the purposes of illustration, a disclosure of a preferred embodiment of the invention, it being expressly understood, that changes may be made in practice within the scope of the claims without digressing from the inventive idea. In the drawings in which similar reference characters denote corresponding parts:

FIG. 1 is a partial side elevation view which is partly broken away and illustrating the carrier being positioned on an automobile roof;

FIG. 2 is a side elevation view illustrating the carrier in position on an automobile roof;

FIG. 3 is a partial elevation view in cross section taken along the planes of the lines 3—3 of FIG. 1 and looking in the direction of the arrows;

FIG. 4 is a cross-sectional view taken along the plane of the line 4—4 of FIG. 3 and looking in the direction of the arrows;

FIG. 5 is an enlarged cross-sectional view of the holding means through which the cross-sectional view of FIG. 4 is taken, the view being similar to that of FIG. 3;

FIG. 12 is a view in cross section taken along the plane of the line 12—12 of FIG. 2 and looking in the direction of the arrows;

FIG. 13 is a view in cross section taken along the plane of the line 13—13 of FIG. 12 and looking in the direction of the arrows;

FIG. 14 is a cross-sectional view taken along the plane of the line 14—14 of FIG. 12 and looking in the direction of the arrows;

FIG. 15 is an enlarged elevation view of that portion of FIG. 2 indicated by the arrowed line 15 therearound;

FIG. 16 is a view in cross section taken along the plane of the line 16—16 of FIG. 15 and looking in the direction of the arrows;

FIG. 17 is a cross-sectional view taken along the plane of the line 17—17 of FIG. 16 and looking in direction of the arrows;

FIG. 18 is a view in cross section taken along the plane of the line 18—18 of FIG. 1 and looking in the direction of the arrows;

FIG. 25 is a side elevation view which is partly broken away and partly in cross section and illustrating the arrangement of the tent structure;

FIG. 26 is a view taken along the planes of the lines 26—26 of FIG. 25 and looking in the direction of the arrows;

FIG. 27 is a view, partly in cross section, taken along the planes of the lines 27—27 of FIG. 26 and looking in the direction of the arrows;

FIG. 28 is a partial cross-sectional view taken along the plane of the line 28—28 of FIG. 26 and between the said numerals and looking in the direction of the arrows;

FIG. 29 is a view similar to that of FIG. 28 and illustrating the members of FIG. 28 in expanded relation;

FIG. 31 is a view in cross section taken along the plane of the line 31—31 of FIG. 26 and looking in the direction of the arrows.

Figure 7:
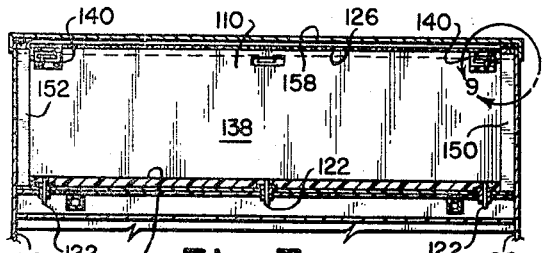
FIG. 7 is an elevation view partly in cross section taken along the plane of the line 7—7 of FIG. 6 and looking in the direction of the arrows.

Referring more particularly to the drawings, wherein like reference characters designate like or corresponding parts throughout the different views, and referring particularly to FIG. 1, the numeral 11 generally designates a streamlined, dome-shaped camping equipment carrier adapted to be carried on the roof of a motor vehicle for use of materials carried by the carrier at a camp site in the manner indicated in FIG. 25.

The carrier comprises a housing 12 with a raised floor 14 on a plurality of support legs 16, 18, 20 and 22 having suction cups such as 24 to engage the roof of a motor vehicle to which it is mounted and means such as 26 and 26' to secure the carrier in position on a vehicle roof, which means extend below the carrier floor to connect with the drip guard 30 around the roof of the motor vehicle. Referring to FIG. 2, it is seen that the securing or connection means 26, which are shown in detail in FIGS. 15 and 16, includes a plate form member 32 depending exteriorly of the housing below the floor with the distal edge 34 being adapted to be seated in the upwardly opening recess of the drip guard 30 and a second plate form member 36 with a hook form distal edge 38 of L shape in cross section, the said second plate being pivotally mounted on a pin 40 supported on the first plate, which pin is spaced exteriorly of and parallel to the first plate to adapt the hook edge 38 to be moved upwardly into tight engagement with the underside of the drip guard. Preferably, the surfaces which engage the drip guard of each plate are provided with a rubber coating or pad, such as 42 and 44, to cushion the carrier unit while supporting it against lateral forces which may be exerted thereon. It is also preferred, as shown in FIG. 15, that the first plate form member 32 be adjustable vertically with respect to the second member to lengthen the connection means to adjust for variations in the styles and models of vehicles to which the carrier may be mounted. In the adjustment means shown, the first plate includes an upper 46 and a lower 48 plate portion which are separate pieces arranged to be adjusted with respect to one another by means of a suitable nut and bolt arrangement such as 50 carried on one of the portions for engagement with the lower portion in either an extended or a retracted position in the sets of holes which are provided. Further, the connection or securing means are adjustable laterally with respect to the housing as shown in FIG. 16, by means of a slidable connection in an elongate transverse recess 52 in a reinforcement channel 54 of the floor 14. The lateral adjustment means comprises a tubular member 56 in telescopic seating engagement in the recess, which member is adapted to be moved inwardly or outwardly and secured in a pre-determined position by means of tightening a bolt 58 passing longitudinally through the tubular member to threadably engage and move a wedge-shaped member 60 into or out of the interior end 62 of the telescopic member to expand the walls outwardly into tight frictional engagement with the walls of the tubular member. In order to accommodate the expansion of the end of the inner telescopic member, as shown in FIG. 17, longitudinal slits such as 64, 66, 68 and 70 are provided to permit of expansion into the said tight frictional engagement. By reason of the aforesaid connection means being adjustable both laterally and vertically with respect to an automobile roof, it is seen that the carrier is adapted to be installed on various shaped roofs of the various types of motor vehicles.

Figure 8:
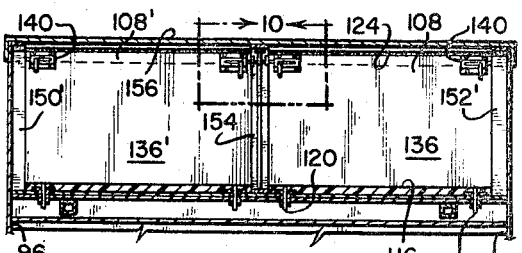
FIG. 8 is an elevation view partly in cross-section taken along the plane of the line 8—8 of FIG. 6 and looking in the direction of the arrows.
Figure 9:
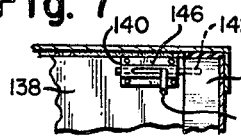
FIG. 9 is an enlarged view of that portion of FIG. 7 indicated by the arrowed line 9 therearound.
Figure 10:
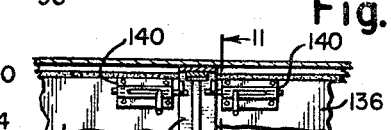
FIG. 10 is an enlarged view of that portion of FIG. 8 indicated by the arrowed line 10 therearound.

As shown in FIG. 1, the unit, which is relatively heavy, is adapted to be raised and lowered by a suitable hoisting means as indicated by the numeral 74 by reason of the fact that a forward and a rearward tubular member 76 and 78 are provided in upstanding relation at spaced points on the longitudinal center line of the floor 14 in which there is telescopically positioned an inner tubular member such as 80 carrying an eye bolt 82 having a stem threaded as at 84 for threaded connection with a wedge member 86 to the drawn upwardly or downwardly into tight frictional engagement with the longitudinally slotted walls of the inner tubular member to expand them into tight frictional engagement with the walls of the forward and rearward upstanding telescopic members respectively. It is thus apparent that the slits 88, 90, 92, and 94, as indicated in FIG. 4, in the end of the inner member are similar to those previously described in connection with the connecting means of the carrier to the vehicle, and the operation thereof is indicated clearly in FIG. 3. The interior of the housing is divided by a forward and a rearward lateral septum 96 and 98 into a main middle storage compartment 100 and a forward and rearward open bottom chamber 102 and 104, the said septums extending from the floor 14 to the ridge or roof 106 of the domed carrier and including medially thereof the aforesaid upstanding tubular members 76 and 78. Removable access panels 108 and 110 of the main chamber, see FIG. 6, as well as FIGS. 1 and 2, are provided on both the driver and the passenger sides 112 and 114 of the carrier, there being two panels 108 and 108' on the passenger side and one on the driver's side. Each of the panels is provided in the lower surface thereof 116 and 118, respectively, with a depending centering pin 120, 122 for receipt in holes in the floor of the carrier and on the outer face of the panels adjacent the upper edge 124 and 126 with a fastening means 128 and 130 to engage a hook knob 132 and 134 on the carrier member. The fastening means are of the type quite commonly characterized as suitcase-type fasteners and used to hold a hinged lid on a suitcase body. When setting the camping unit up for use, these access panels are removed and set aside for a subsequent use to be explained hereinafter. Referring to FIGS. 7 and 8, as well as 9 and 10, each of the panels is provided with a locking means carried on the interior face 136, 136', and 138, the said locking means being generally designated by the numeral 140 and including a slidable lock bolt 142 having an operator 144 and arranged in a guide track 146 to be moved into and out of engagement with a vertical support post 150 on the interior of the carrier to securely lock the panels in position, it being noted that with respect to the driver's side panel 110 the support post 150 is companionately positioned with respect to a support post at the other end of the housing 152 and, with respect to the passenger side, the counter-parts of these support posts are designated 152' and 150', it being noted that an intermediate support post 154 is provided.

Figure 6:
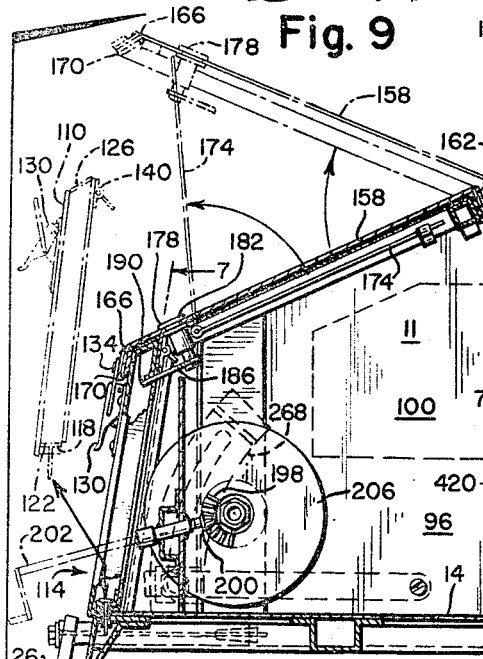
FIG. 6 is a rear elevation view in cross-section taken along the planes of the lines 6—6 of FIG. 1 and looking in the direction of the arrows.
Figure 11:
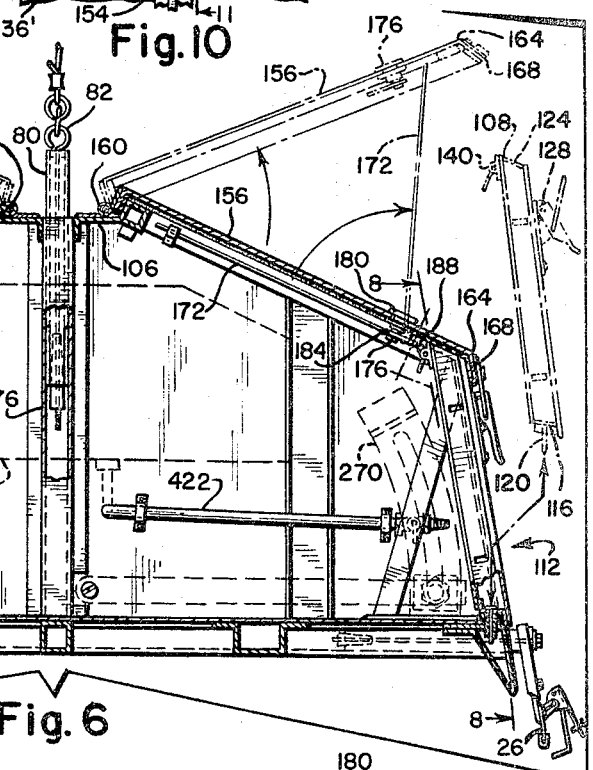
FIG. 11 is an enlarged cross-sectional view taken along the plane of the line 11—11 of FIG. 10 and looking in the direction of the arrows.
Figure 30:
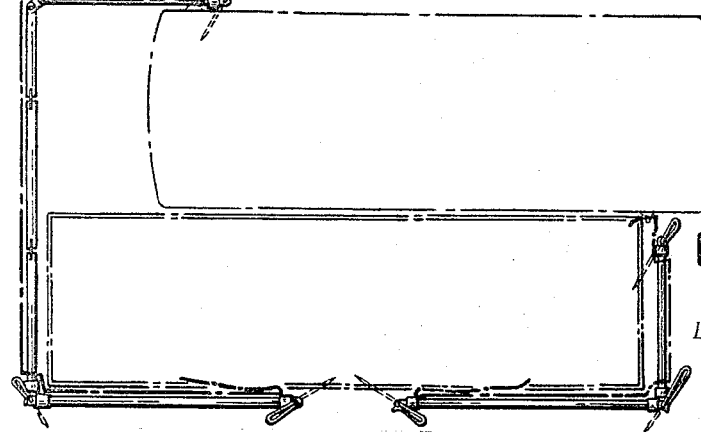
FIG. 30 is a view in cross section taken along the plane of the line 30—30 of FIG. 25 and looking in the direction of the arrows.

Also, as indicated in FIG. 6, hinged type access doors 156 and 158 are provided on each side of the carrier housing, the doors being hingedly mounted as at 160 and 162 to the aforesaid ridge section or roof 106 of the carrier and arranged such that the respective distal edges 164 and 166, which are bent downwardly to provide lip sections 168 and 170, may be raised upwardly to the positions indicated by phantom lines in FIG. 6. Adjacent each of the doors a support rod 172 and 174 is pivotally connected to the housing to engage the doors adjacent the said lip portion to hold them in the open position. Additionally, each of the doors is preferably provided with a means to lock it generally designated by the numeral 176 and 178 which comprises lock housings 180 and 182 passed through holes in the roof and carrying a lock pin 184 and 186 adapted to be rotated such that the distal ends 188 and 190 may be moved into slots or lock holes in the carrier on passage of a key (not shown) into the housing which is properly grooved so as to align a lock slot.

Longitudinally spanning the main storage compartment a shaft 192 is provided to carry an awning or canopy in a rolled attitude thereon, the said shaft being aligned longitudinally with respect to the longitudinal center line of the car and spaced therefrom on the driver's side of the vehicle. The shaft is journalled at each end 194 and 196 to the septums and adjacent one end is provided with a gear 198 for meshing with a gear 200 on a removable crank arm 202 shown in dotted line in FIG. 6, which is adapted to rotate the shaft. Each end of the shaft is provided with a flanged end 204 and 206 to guide the rolling of a canopy thereover and, for removal of the shaft, it includes an outer flanged sleeve 208 having longitudinally-extending slots 210 and 212 and carrying interiorly thereof slide members 214 and 216 which house slide blocks 218 and 220, the said slide members and slide blocks being connected together by means of a headed screw such as 222 and 224 whereby the sleeve is adapted to be moved relative to the slide members. It is to the distal ends of the slide member that bearings 226 and 228 are carried and which are housed in the bearing caps 230 and 232 of the septums. Thus, it is seen that the headed screws are adapted to be tightened or loosened for adjusting the shaft so that it may be removed from the slide members and placed in an out-of-the-way position. Further, the shaft sleeve is provided with a plurality of hooks 234, 236, 238, 240, 244, 246 and 248 longitudinally spaced at intervals along the length thereof to engage grommets such as 250 on the edge of a folded awning or canopy. When not in use, the grommets of the canopy are connected to the hooks and the shaft is rotated in the direction indicated in FIG. 14 to cause the awning to be rolled up in a manner similar to that in which storekeepers roll up the awnings in front of their stores. When setting up the camping unit at a camp site, the awning is unrolled by simply reversing the direction of turn indicated in FIG. 14, and, as is apparent from the drawings, continued turning in the counter-clockwise direction will automatically release the grommets from the hooks when a force F tending to pull the canopy from the shaft or out of the main storage compartment is exerted on it. Referring briefly to the forward and rearward chambers between the respective septums in the front and rear chambers of the carrier, each includes a sleeve 252, 254, 256, and 258, each of which is pivotally connected at one end to a pivot pin 260, 262, 264 and 266 carried in the respective septums whereby the distal ends of the sleeves are arranged for arcuate movement with the other ends of the sleeves being slidably connected in arcuate guide tracks such as 268 and 270 in the septums. The sleeves provided supports for poles for use in setting up a tent as will be described hereinafter. Access plates, 272 and 274, seen in FIG. 1 and particularly in FIG. 18, are provided for the forward and rearward chamber. Each of the access plates is provided with an upper lip 276 which is bent back upon itself to provide a recess 278 to engage a companionate lip 280 of the main surface of the carrier and at the lower end with a locking means 282, such as the member 284 adapted to be received in snapping engagement between spring-biased rollers such as 286. Preferably, the access plate is provided with a chain 288 which, at one end thereof, is connected to the carrier and, at the other end thereof, is connected to the access plate so that the said plates will not be mislaid in assembling the unit or camping structure which is now to be described.

Figure 19:
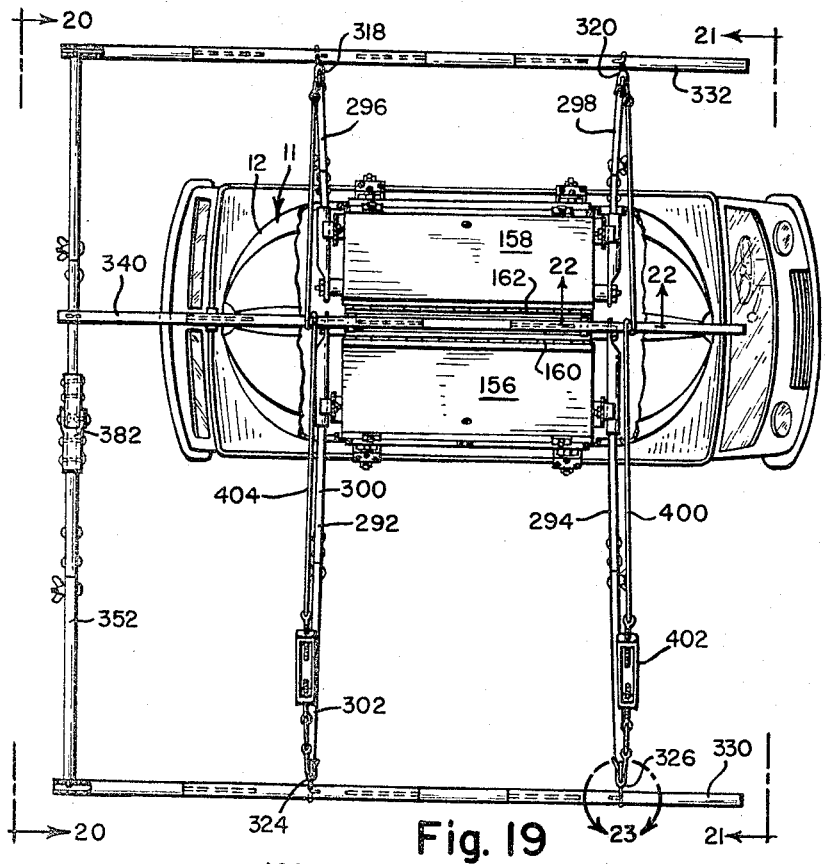
FIG. 19 is a plan view of the camping unit and illustrating it in a partially assembled state.
Figure 22:
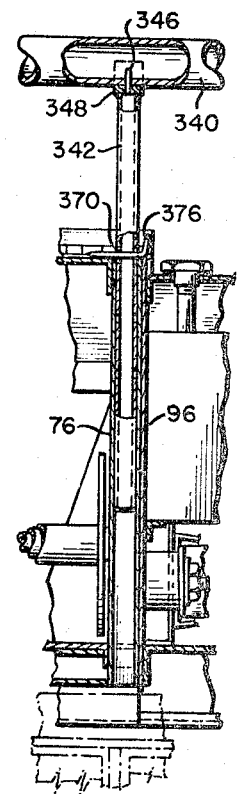
FIG. 22 is a partial view taken along the plane of the line 22—22 of FIG. 19 and looking in the direction of the arrows.
Figure 20:
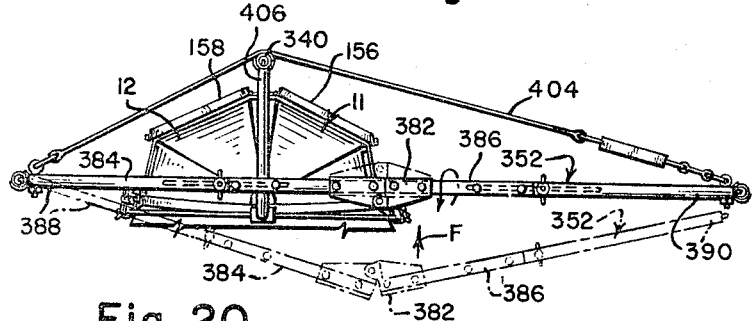
FIG. 20 is a view in cross section of the carrier taken along the plane of the line 20—20 of FIG. 19 and lookin the direction of the arrows, the said view illustrating the operation of the parts.
Figure 21:
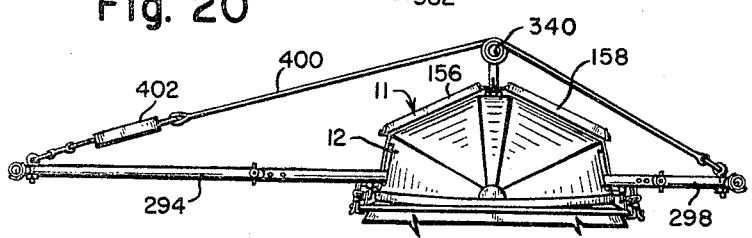
FIG. 21 is an end elevation view similar to FIG. 20 and taken along the plane of the line 21—21 of FIG. 19 and looking in the direction of the arrows.
Figure 23:
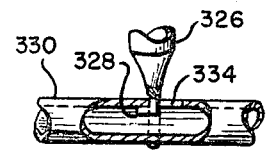
FIG. 23 is an enlarged, partially broken away view of that portion of FIG. 19 indicated by the arrowed line 23 therearound.
Figure 24:
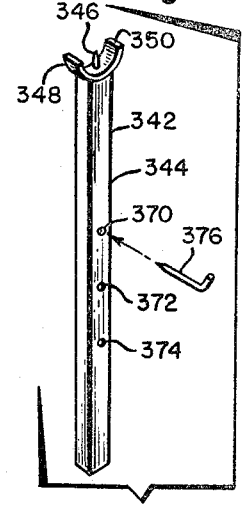
FIG. 24 is a perspective view of a support piece indicated by the numeral 24 in FIG. 22.

As already indicated by previous reference to FIG. 25, the materials in the carrier include a tent structure when assembled in combination with the carrier housing. One installing the unit at a camp site removes the canopy 290 from the carrier unit and lays it aside and proceeds to erect a frame over the carrier unit. The frame includes a first pair of spreader bars 292 and 294 adapted to extend from one side of the carrier and automobile from the passenger side thereof and a second pair of spreader bars 296 and 298 extending a shorter distance from the driver's side of the carrier unit when installed. In the embodiment shown, each of the spreader bars is telescopically received in one of the pivotal sleeves of the forward and rearward chambers and the distal ends thereof are adjusted angularly so that the distal ends of the spreader bars are in a substantially common horizontal plane with the spreader bars being preferably horizontally-disposed and extending from the roof of the automobile, as can be seen in FIG. 26. In the case of the shorter spreader bars, 296 and 298 on the driver's side, a single, straight tubular member is sufficient; however, since the bars 292 and 294 of the passenger side extend a considerable distance, these bars include a first and a second portion 300 and 302 with a connecting member 304 therebetween which, as seen in FIG. 28, is secured in the confronting end 306 of the portion 300 and held in place by means of bolts 308 and 310 and which, when the portions are connected, projects into the spreader bar 302 to be fastened thereto by means of the bolt 312 and wing nut 314 passed through aligned holes in the end 316 of the portion 302 and the connecting member. Referring to FIGS. 19 and 23, the distal ends 318, 320, 324 and 326 of the spreader bars are provided with right-angularly bent pins such as 328, the distal ends of which confront one another on each side of the carrier when properly assembled. To the distal ends of the spreader bars a passenger side eave pole 330 and a driver's side eave pole 332 are connected to extend substantially along the length of the body of the vehicle or car and, preferably, further as indicated in FIG. 19. Intermediate the length of the eave poles an elongate slot 334 is provided such that the right-angularly bent pin 328 is adapted to be received therein when the poles are sprung slightly outwardly with respect to their mounting in the pivotal sleeves so that the spreader bars normally tend to hold the distal end of the pins within the interior of the eave poles. The frame further includes an elevated ridge pole 340 which is supported above and parallel to the center line of the carrier and, consequently, a vehicle to which it is mounted. The ridge pole 340 is supported on a support element 342 and 344 such as that shown in FIG. 24. Each of the said elements is received in one of the upstanding tubular members 76 and 78 and the distal end of the elements is bifurcated and includes a central pin 346 extending into the bifurcation space. As can be seen in FIG. 22, by reason of the structure, the pins of the respective elements are adapted to be received in holes in the side wall of the tubular ridge piece 340 and supported in the cradle defined between the arms 348 and 350 of the bifurcated end. Means are provided to adjust the height of the ridge pole consisting of holes such as 370, 372 and 374 in the elements adapted to pass a pin 376 to span the mouth of the upstanding tubular members 76 and 78 and thereby support the weight carried by the ridge pole. An additional lateral spreader bar 352 may be provided as shown in FIG. 19 and which connects to the ends of the eave poles by any suitable means such as that indicated in FIG. 20 which, in the embodiment shown, comprises a bifurcated end having a central pin similar to that shown in FIG. 24. The lateral spreader bar is provided intermediate its length with a pivot connection 382 between a first leg 384 and a second leg 386 whereby the ends of the lateral spreader bar 388 and 390 may be engaged to the rearward end of the eave poles and thereafter the confronting ends of the legs pushed upwardly in the direction indicated by the arrow F in FIG. 20, to move the spreader bar into the position shown in FIG. 20. To complete the frame a line 400 having its first end connected to one of the eave poles is drawn transversely of the vehicle over the ridge pole to the other eave pole to which it is suitably connected, and, intermediate the length of the line, a turnbuckle 402 may be provided to tighten it and, preferably, the line is wrapped once around the ridge pole as indicated in FIG. 19. In a similar manner, a rearward transverse line 404 is provided. The rearwardmost end of the ridge pole is supported by a bar 406 which connects it to the rear surface of the roof of the automobile. After the frame is thus arranged, the canopy 290 and tent side walls connected to the canopy by means of hooks such as 408 are supported and suspended respectively by the frame. The lower ends of the side walls may be provided with weights in the conventional manner or, alternatively, a skirt or apron may be provided in a manner indicated in the drawings as well as a floor comprising a covering for an area of ground which is suitably stapled into the ground in the manner indicated.

The removable panels referred to above may be suspended on support bars such as 410, 412, 414 and 416 which connect to the carrier. In this manner, when the shelves are suitably connected by connecting means such as 418 in FIG. 31, they are adapted to provide a surface for food or beverages within the protective shelter provided by the assembled unit.

Within the main storage chamber of the housing articles for use by a camper may be carried, such as thermos jugs, food and the like, which is readily accessible from the interior of the unit when assembled. Additionally, a water tank 420 may be provided in the forward chamber with a conduit 422 connecting it and a spigot which is accessibly located from within the structure. A port for filling the water container tank may be located at any suitable point such as that indicated in FIG. 1 by the numeral 461.

It is also noted that the instant carrier unit is dust proof by reason of the forward and rearward septum and the tightly fitting access doors which are held in position by reason of the fact that the lock pins 184 and 168 are arranged such that when the distal ends 188 and 190 are moved into the slots of the lock holes in the carrier, the panels and hinged doors are drawn into tight dust-barrier relation. It is further noted that by reason of the provision of support elements 342 and 344, FIG. 24, which are adjustably received in the tubular member 76 and 78, the height of the ridge of the frame is adjustable in that the ridge pole may be moved upwardly or downwardly by re-arrangement of the pin 376 in any one of a plurality of holes which may be provided in the element 342, see FIG. 22.

It is thus apparent by reason of the foregoing structure I have provided a novel, compact and useful structure which is adapted to be utilized by campers, and, while the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus and articles.

What is claimed is:

1. A camping unit comprising; a floored housing with septums defining a cargo-carrying main compartment, and a forward and a rearward chamber, said housing being adapted to be supported on the roof of a vehicle, adjustable means carried on opposite sides of the housing to detachably connect the unit to the vehicle, the said adjustable means being adjustable vertically and horizontally, access means on the housing communicating with the interior of said housing and hinged doors above said access means, the hinged side of said doors being adjacent the longitudinal center line of the top of said housing; locking means for the said doors; pivotally mounted sleeves supported on each side of the housing in the forward and rearward chamber; guide means for the distal ends of the sleeves outwardly of the main center line of the housing; spreader bars, carried in the housing and arranged to be seated in the sleeves as extensions of said sleeves; an eave pole for connection with the spreader bars of the unit, and means to connect the spreader bars and the eave poles, a ridge pole to be supported above said housing, support means to connect the ridge pole to the housing and to hold it above said housing, the said spreader bars, eave pole and ridge pole when connected together comprising a frame extending outwardly of the sides of the housing and above the housing, the said frame being adapted to support an outer tent covering thereover.

2. A unit as set forth in claim 1 wherein said spreader bars are in two sections and means to connect the said sections together to define said spreader bar, said spreader bars being adapted to be carried when disassembled in said unit.

3. A unit as set forth in claim 1 wherein means are provided to raise the frame as a unit above said housing.

4. A unit as set forth in claim 1 wherein a canvas tent cover is arranged in said main storage compartment, and means in said main storage compartment to store said tent, said means comprising a longitudinally extending shaft, means to connect the tent to the shaft, and means to rotate the shaft to store the tent in a rolled condition, said means being along one side of said main compartment.

5. A camping unit comprising a closed shell type housing having a floor, opposing side and end walls and a roof; said housing being sized to nest on the roof of a vehicle; adjustable means carried on opposite sides of the housing to detachably mount the same to a vehicle and adjust the same vertically and horizontally; lateral septum means extending transversely across the housing between the opposing side walls to separate the housing into a main storage compartment and a forward and rearward operating compartments, said operating compartments being adjacent the front and rear walls respectively; access means in the opposing side walls of the housing to communicate with the interior of the main chamber along the longitudinal length thereof; lateral spreader bars in said housing and means secured in the forward and rearward chambers to support the spreader bars in laterally extending relation to define a horizontal plane; an eave pole to connect to the distal end of the spreader bars and means to connect said eave pole to the ends of said spreader bars; a ridge pole and means to support said ridge pole centrally in longitudinally extending relation above said housing, said spreader bars, eave pole and ridge pole when connected together defining a frame extending outwardly of the housing and above the housing, said frame being adapted to support an outer tent covering thereof, and an outer tent covering on the frame to provide a roof.

References Cited by the Examiner

UNITED STATES PATENTS

| | | | |
|---|---|---|---|
| 2,109,571 | 3/1938 | Le Boeuf | 224—42.1 |
| 2,306,537 | 12/1942 | Hamm | 296—23 |
| 2,640,204 | 6/1953 | Cutler | 135—1 |
| 3,008,784 | 11/1961 | Allard | 224—42.1 |
| 3,111,955 | 11/1963 | Green | 296—23 |

MILTON BUCHLER, *Primary Examiner.*

BENJAMIN HERSH, *Examiner.*

P. GOODMAN, *Assistant Examiner.*